US011097952B2

(12) United States Patent
Chow et al.

(10) Patent No.: US 11,097,952 B2
(45) Date of Patent: Aug. 24, 2021

(54) OXYGEN-ENHANCED CLAUS CARBON DIOXIDE RECOVERY

(71) Applicant: Fluor Technologies Corporation, Sugar Land, TX (US)

(72) Inventors: Thomas K. T. Chow, Villa Park, CA (US); Ryan Y. D. Chow, Bethesda, MD (US); Ghaith Aljazzar, Irvine, CA (US); Denny Li, Fountain Valley, CA (US)

(73) Assignee: Fluor Technologies Corporation, Irving, TX (US)

( * ) Notice: Subject to any disclaimer, the term of this patent is extended or adjusted under 35 U.S.C. 154(b) by 178 days.

(21) Appl. No.: 16/435,056

(22) Filed: Jun. 7, 2019

(65) Prior Publication Data
US 2020/0385274 A1 Dec. 10, 2020

(51) Int. Cl.
| | | |
|---|---|---|
| *C01B 32/50* | (2017.01) | |
| *B01D 53/14* | (2006.01) | |
| *B01D 53/18* | (2006.01) | |
| *B01D 53/26* | (2006.01) | |
| *B01D 53/46* | (2006.01) | |
| *B01D 53/75* | (2006.01) | |
| *B01D 53/86* | (2006.01) | |

(52) U.S. Cl.
CPC .......... *C01B 32/50* (2017.08); *B01D 53/1418* (2013.01); *B01D 53/1468* (2013.01); *B01D 53/18* (2013.01); *B01D 53/26* (2013.01); *B01D 53/46* (2013.01); *B01D 53/75* (2013.01); *B01D 53/8671* (2013.01); *B01D 2255/20707* (2013.01); *B01D 2257/108* (2013.01); *B01D 2257/304* (2013.01); *B01D 2257/80* (2013.01)

(58) Field of Classification Search
CPC . C01B 17/0404; C01B 17/0413; C01B 32/50; B01D 53/52; B01D 53/526; B01D 53/62; B01D 53/8612; B01D 2251/102; B01D 2256/22; B01D 2257/304; B01D 2257/504; B01J 7/00
See application file for complete search history.

(56) References Cited

U.S. PATENT DOCUMENTS

| | | | |
|---|---|---|---|
| 2011/0195008 A1* | 8/2011 | Menzel | C01B 17/0408 423/242.1 |
| 2013/0071308 A1* | 3/2013 | Graville | B01D 53/8618 423/224 |
| 2017/0216812 A1* | 8/2017 | Weiss | B01J 19/245 |
| 2020/0360854 A1* | 11/2020 | Vaidya | B01D 53/1475 |

* cited by examiner

*Primary Examiner* — Timothy C Vanoy
(74) *Attorney, Agent, or Firm* — Conley Rose, PC

(57) ABSTRACT

Processes and systems for oxygen-enhanced Claus carbon dioxide recovery are disclosed. Oxygen is fed to a sulfur recovery unit instead of air. The tail gas is fed to a tail gas treatment unit which produces a treated tail gas, and the treated tail gas is processed in a carbon dioxide recovery unit to produce a carbon dioxide product. A method for retrofitting an existing sulfur recovery unit and tail gas treatment unit so as to recover the carbon dioxide product is also disclosed.

20 Claims, 3 Drawing Sheets

OXYGEN-ENHANCED CLAUS CARBON DIOXIDE RECOVERY

TECHNICAL FIELD

The present disclosure relates to processes and systems for recovery of a carbon dioxide product from a treated Claus tail gas stream.

BACKGROUND

Carbon dioxide ($CO_2$) emissions to the atmosphere are a concern in the oil, gas, and chemical industries. In the context of treating acid gas streams using a sulfur removal unit followed by a tail gas treatment unit, the treated tail gas usually contains hydrogen sulfide ($H_2S$), carbonyl sulfide (COS), carbon disulfide ($CS_2$), nitrogen ($N_2$), water ($H_2O$), carbon dioxide ($CO_2$), as well as other sulfur contaminants. Current $CO_2$ recovery technologies focus on recovering $CO_2$ from a treated tail gas by utilizing a $CO_2$ absorber in combination with a stripper to recover the $CO_2$. Recovering $CO_2$ from a treated gas stream having these components necessitates separation steps for all the components, is energy intensive, and involves high capital and operating expenditures.

SUMMARY

Disclosed herein are processes and systems for recovery of carbon dioxide from an acid gas stream. Also disclosed are methods of retrofitting a sulfur recovery unit and a tail gas treatment unit to recover a carbon dioxide product stream.

A process for recovery of carbon dioxide from an acid gas stream can include one or more of: feeding a first oxygen stream comprising at least 90 vol % oxygen and the acid gas stream comprising carbon dioxide and sulfur-containing compounds to a sulfur recovery unit; recovering a sulfur product stream and a tail gas stream from the sulfur recovery unit, wherein the tail gas stream comprises carbon dioxide, hydrogen, sulfur-containing compounds, water, and hydrogen sulfide; receiving the tail gas stream in a tail gas treatment unit; contacting, in the tail gas treatment unit, the sulfur-containing compounds and hydrogen received from the tail gas stream with a hydrogenation catalyst to produce a hydrogenated product stream comprising carbon dioxide, hydrogen sulfide, water, and hydrogen; contacting the hydrogenated product stream with a solvent in an absorber to produce a treated tail gas stream and a $H_2S$-loaded solvent stream, wherein the treated tail gas stream comprises carbon dioxide, water, and hydrogen, wherein the $H_2S$-loaded solvent stream comprises hydrogen sulfide and the solvent; converting, via thermal oxidation or catalytic oxidation, hydrogen of the treated tail gas stream to water to produce an oxidation product stream comprising carbon dioxide and water; cooling and optionally increasing a pressure of the oxidation product stream; and separating water from the oxidation product stream to produce a carbon dioxide product stream.

A system for recovery of a carbon dioxide product stream from acid gas can include one or more of: an oxygen source configured to produce a first oxygen stream comprising at least 90 vol % oxygen; a sulfur recovery unit configured to receive the first oxygen stream and an acid gas stream and configured to produce a tail gas stream and a sulfur product stream, wherein the tail gas stream comprises carbon dioxide, hydrogen, sulfur-containing compounds, water, and hydrogen sulfide; a tail gas treatment unit comprising a hydrogenation reactor and an absorber; and a carbon dioxide recovery unit comprising an oxidation reactor and a dehydration unit. The hydrogenation reactor can be configured to convert the sulfur-containing compounds received from the tail gas stream to hydrogen sulfide, and produce a hydrogenated product stream. The absorber can be configured to receive the hydrogenated product stream, selectively absorb hydrogen sulfide, produce a treated tail gas stream comprising carbon dioxide, water, and hydrogen, and produce a H2S-loaded solvent stream comprising hydrogen sulfide and a solvent. The oxidation reactor can be configured to receive the treated tail gas stream and to convert hydrogen to water via thermal oxidation or catalytic oxidation to produce an oxidation product stream comprising carbon dioxide and water. The dehydration unit can be configured to receive the oxidation product stream and to separate the water from the carbon dioxide to produce the carbon dioxide product stream.

A method for retrofitting a sulfur recovery unit and a tail gas treatment unit to recover a carbon dioxide product stream can include one or more of: connecting the sulfur recovery unit to an oxygen source configured to provide an oxygen stream comprising equal to or greater than 90 vol % oxygen to a burner of the sulfur recovery unit; disallowing a flow of air to the burner of the sulfur recovery unit; adding a desuperheater/direct contact condenser upstream of an absorber in the tail gas treatment unit, wherein the desuperheater/direct contact condenser is configured to at least partially condense water for removal from the tail gas treatment unit at a location upstream of the absorber; and adding a carbon dioxide recovery unit that is configured to produce the carbon dioxide product stream from a treated tail gas stream received from the tail gas treatment unit.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

Figure 1:
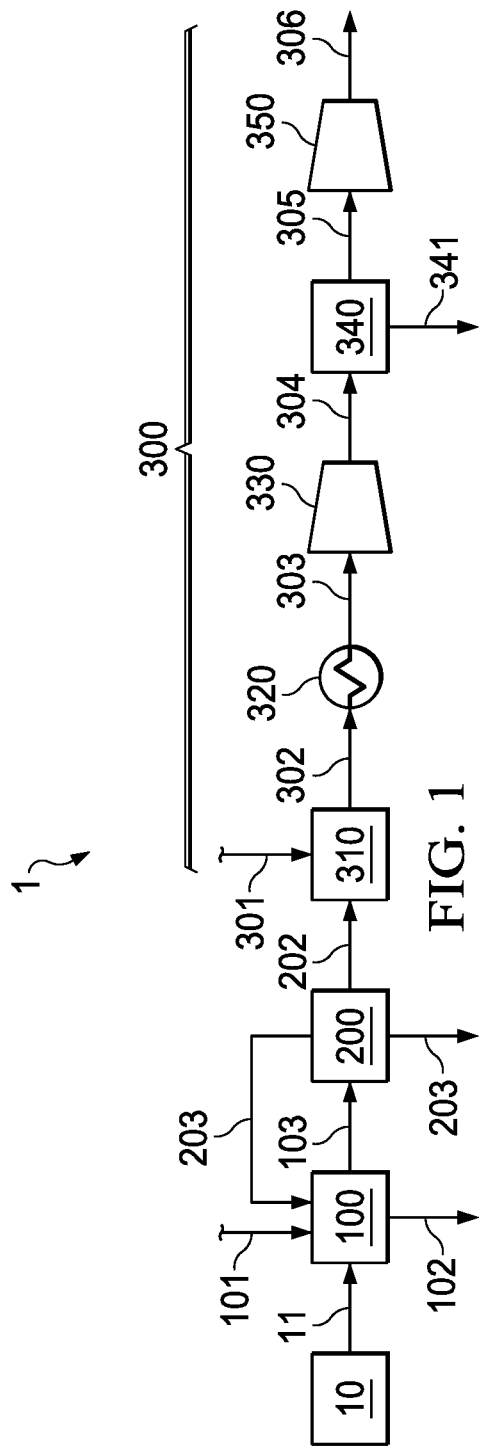
FIG. 1 is a schematic of an oxygen-enhanced Claus carbon dioxide recovery system 1.

Various objects, features, aspects and advantages of the present invention will become more apparent from the following detailed description of embodiments of the invention.

DETAILED DESCRIPTION

It should be understood at the outset that although an illustrative implementation of one or more embodiments are provided below, the disclosed systems and methods may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As utilized herein, the term "about" in conjunction with a numeral refers to that numeral +/−10%, inclusive. For example, where a temperature is "about 100° F.", a temperature range of 90-110° F., inclusive, is contemplated.

As utilized herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As utilized herein, the sulfur recovery unit can be abbreviated as "SRU".

As utilized herein, the tail gas treatment unit can be abbreviated as "TGTU".

As utilized herein, the term "sulfur-containing compounds" generally refers to chemical compounds that contain at least one sulfur atom. In some embodiments, hydrogen sulfide ($H_2S$) is included within the scope of "sulfur-containing compounds", while in other embodiments, $H_2S$ is not included within the scope of "sulfur-containing compounds."

As utilized herein, the term "on-spec pressure" refers to a pressure specified for a particular application, that the pressure meets a specified pressure, or a specification.

It has been discovered that a suitably pure carbon dioxide product stream can be recovered at low cost from a tail gas treatment unit when an oxygen stream is fed to a sulfur recovery unit instead of air. Feeding oxygen as opposed to air to the sulfur recovery unit reduces the amount of nitrogen and nitrogen-containing compounds in the sulfur recovery unit and in downstream equipment (e.g., tail as treatment unit) which are difficult u separate from carbon dioxide. Moreover, feeding a higher concentration of oxygen as compared with conventional feeding of air) allows the sulfur recovery unit to operate at a higher temperature, which changes the chemical reactions present in the sulfur recovery unit, for example, a higher amount of hydrogen is produced. The hydrogen produced in the sulfur recovery unit can be utilized to convert oxygen to water, which can be separated from carbon dioxide at relatively low cost. Moreover still, the use of oxygen as opposed to air effectively increases the processing capacity of the sulfur recovery unit by as much as 150% of the original design capacity. The disclosed processes and systems also afford for smaller equipment sizes, which means that existing equipment can have a higher processing capacity of acid gases fed to the sultry recovery unit or a lower capital expenditure for a new plant since for a given capacity, equipment size can be smaller.

FIG. 1 is a schematic of an oxygen-enhanced Claus carbon dioxide recovery system 1. Embodiments of the system 1 utilize one or more of an oxygen source 10, a sulfur recovery unit 100, a tail gas treatment unit (TGTU) 200, and a carbon dioxide recovery unit 300.

The oxygen source 10 is configured to provide the oxygen stream 11 containing at least 90 vol % oxygen (e.g., 90, 91, 92, 93, 94, 95, 96, 97, 98, 98.1, 98.2, 98.3, 98.4, 98.5, 98.6, 98.7, 98.8, 98.9, 99, 99.1, 99.2, 99.3, 99.4, 99.5, 99.6, 99.7, 99.8, 99.9, or 100 vol % oxygen) to the sulfur recovery unit 100. The oxygen source 10 can also be configured to provide any of oxygen stream 201 and oxygen stream 301, each having a concentration of oxygen appropriate for the processes to which they are fed. In embodiments, any of oxygen streams 11 (FIGS. 1-3), 201 (FIG. 5), and 301 (FIGS. 1-2) have a reduced nitrogen content (e.g., 0-10 vol %), and in some embodiments, do not have significant amounts (e.g., less than 5 vol %) of nitrogen so that nitrogen components are not introduced to the systems and processes disclosed herein. The oxygen source 10 can obtain oxygen at a desired purity from an oxygen storage tank, or via a process known in the art, for example, the separation of air into nitrogen and oxygen, such as pressure swing adsorption (PSA), vacuum swing adsorption (VSA), or cryogenic separation techniques.

The sulfur recovery unit 100 is configured to receive the oxygen stream 11 and an acid gas stream 101, and to produce a sulfur product stream 102 and a tail gas stream 103. As explained in more detail for FIG. 3, the sulfur recovery unit 100 generally operates with a thermal stage 110 and a catalytic stage 120 to convert the component gases (e.g., sulfur dioxide ($SO_2$) and $H_2S$) received from the acid gas stream 101 to elemental sulfur (in gaseous phase) and water. The Claus reaction mixture is cooled in heat exchangers so that liquid elemental sulfur is recovered in the sulfur product stream 102 while other components remain in gas phase and are collected in the tail gas stream 103. In embodiments, the tail gas stream 103 predominantly includes $H_2$, $H_2S$, $SO_2$, $H_2O$, $CO_2$, and small amounts of other sulfur-containing species (e.g., sulfur (S), carbon disulfide ($CS_2$), carbonyl sulfide (COS)). In particular embodiments, the tail gas stream 103 contains less than 10, 9, 8, 7, 6, 5, 4, 3, 1, 0.9, 0.8, 0.7, 0.6, 0.5, 0.4, 0.3, 0.2, or 0.1 vol % nitrogen-containing compounds. In an embodiment, the tail gas stream 103 contains no nitrogen-containing compounds.

Figure 4:
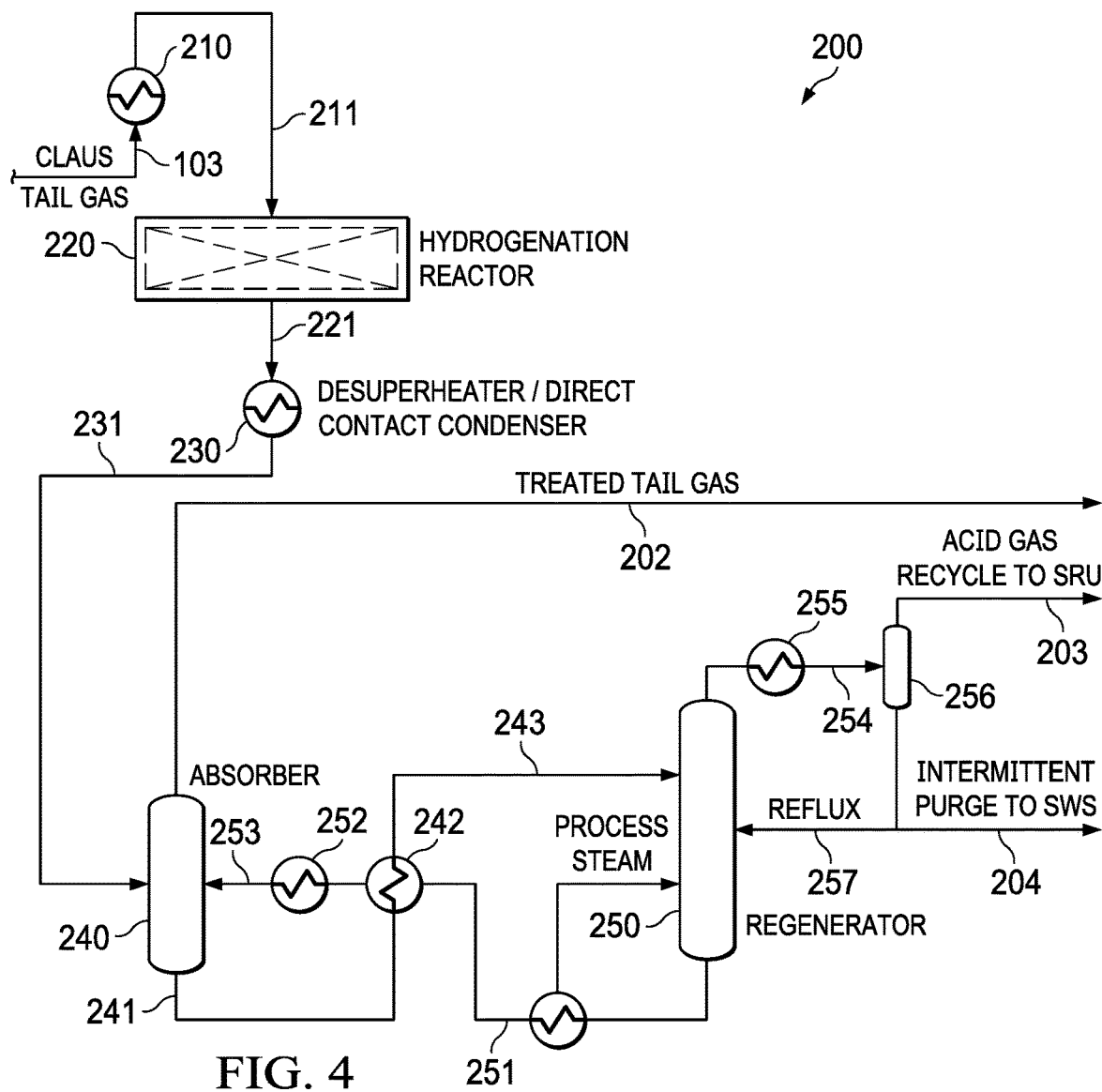
FIG. 4 is a schematic of an exemplary tail gas treatment unit 200 used in FIGS. 1-2.

As described in more detail for FIG. 4, the TGTU 200 is configured to convert sulfur-containing compounds received from the tail gas stream 103 to $H_2S$, and most of the $H_2S$ that is received from the tail gas stream 103 along with the $H_2S$ that is generated in the TGTU 200 is absorbed in an absorber of the TGTU 200 to produce a treated tail gas stream 202 (e.g., as shown in FIG. 4, treated tail gas stream 202 is an absorber overhead stream). The treated tail gas stream 202 can contain $CO_2$, $H_2$, water vapor, and trace amounts of $H_2S$, COS, and optionally $N_2$ (e.g., for less than 100 vol % oxygen in oxygen stream 11). In embodiments, the treated tail gas stream 202 contains 30-70 vol % $CO_2$, 10-30 vol % $H_2$, and 10-30 vol % $H_2O$, 2-10 ppmv $H_2S$, and trace amounts of other components such as COS and optionally $N_2$. $H_2S$ recovered by the TGTU 200 is recycled to the SRU 100 via acid gas recycle stream 203.

The carbon dioxide recovery unit 300 can include one or more of an oxidation reactor 310, a heat exchanger 320, a blower or compressor 330, a dehydration unit 340, and an optional second blower or compressor 350.

The oxidation reactor 310 is configured to receive the treated tail gas stream 202 and an oxygen stream 301, and to operate at conditions sufficient to oxidize hydrogen received from the treated tail gas stream 202 to $H_2O$, for example via a thermal oxidation process. In the thermal oxidation process, heat is provided by combustion of hydrogen with oxygen, with no requirement for additional fuel to a burner (e.g., via a flame) or otherwise for heat to ceramic pieces (e.g., flameless thermal oxidation) in the oxidation reactor 310, to sustain a temperature sufficient to convert hydrogen to $H_2O$ vapor. Alternatively, a burner or heated ceramic pieces can be used to sustain the thermal oxidation reactions in the oxidation reactor 310. The oxidation reactor 310 can be embodied as an incinerator vessel having a chamber therein where the oxidation of hydrogen occurs. It is contemplated that trace amounts of other components (e.g., $N_2$, $H_2S$, $SO_2$, COS, $CS_2$) in the treated tail gas 202 can be oxidized in the thermal oxidation process; however, the amount of these reactions should be marginal or negligible since removal of $H_2S$ and other sulfur-containing compounds is accomplished in the TGTU 200 down at least to ppmv levels, and nitrogen is only present in trace amounts due to the use of oxygen stream 11 in the SRU 100 instead of air. Thus, the primary function of the oxidation reactor 310 is to convert hydrogen to water vapor. The carbon dioxide and water received in the oxidation reactor 310 from the treated tail gas stream 202 pass through the oxidation reactor 310 and into the oxidation product stream 302.

The oxidation product stream 302 produced by the oxidation reactor contains carbon dioxide and water vapor (water vapor received from treated tail gas stream 202 and water produced in the reactor 310). The combined concentration of carbon dioxide and water vapor in the oxidation product stream 302 can be greater than 98, 99, 99.1, 99.2, 99.3, 99.4, 99.5, 99.6, 99.7, 99.8, 99.9, 99.99, or 99.999 vol %. Trace amounts of components other than water and carbon dioxide in the oxidation product stream 302 can be less than about 2, 1, 0.9, 0.8, 0.7, 0.6, 0.5, 0.4, 0.3, 0.2, 0.1, 0.01, 0.001 vol %.

The oxidation product stream 302 can be cooled in heat exchanger 320 to produce a cooled oxidation product stream 303 suitable for the downstream blower or compressor 330 operation. In embodiments, the heat exchanger 320 can include a desuperheater/direct contact condenser configuration. The desuperheater/direct contact condenser can be a column or tower as is known in the art with the aid of this disclosure.

In embodiments where the oxidation product stream 302 or the cooled oxidation product stream 303 is at a low pressure, a blower or compressor 330 can be utilized to increase a pressure of the oxidation product stream 302 or the cooled oxidation product stream 303. Increasing pressure provides a driving force for recovery of carbon dioxide from liquid water in the dehydration unit 340.

The dehydration unit 340 can be configured to separate liquid water from the gaseous carbon dioxide, producing a water stream 341 and a carbon dioxide product stream 305. The dehydration unit 340 can be embodied as a separation vessel that separates carbon dioxide gas and liquid water, e.g., a vapor/liquid separator or a glycol unit to remove water to a bone dried condition to mitigate crystallization of water droplets while reaching or passing the critical phase change. Employment of such drying unit will depend on the pressure requirement of the final $CO_2$ product. In embodiments, the dehydration unit 340 can include an additional heat exchanger(s) upstream of the separation vessel (e.g., chillers, etc.), if needed, to condense a portion of the water into liquid phase for separation in the separation vessel, which can allow for the carbon dioxide product stream 305 to meet a water content specification (e.g., a dew point threshold, etc.).

In embodiments, the water stream 341 can have greater than 99, 99.1, 99.2, 99.3, 99.4, 99.5, 99.6, 99.7, 99.8, 99.9, 99.99, 99.999 wt % liquid water. In embodiments, the carbon dioxide product stream 305 can have greater than 95, 96, 97, 98, 99, 99.1, 99.2, 99.3, 99.4, 99.5, 99.6, 99.7, 99.8, 99.9, 99.99, 99.999 vol % carbon dioxide.

The sequence of the oxidation reactor 310, heat exchanger 320, blower or compressor 330, and dehydration unit 340 is a low cost alternative to other expensive carbon dioxide recovery technologies, such as absorber/stripper configurations that attempt to remove the carbon dioxide from a larger stream, rather than removing the remaining components and leaving the carbon dioxide.

In optional embodiments, the carbon dioxide product stream 305 can be pressurized (e.g. in a blower or compressor 350) to form the pressurized carbon dioxide product stream 306 having an on-spec pressure.

Figure 2:
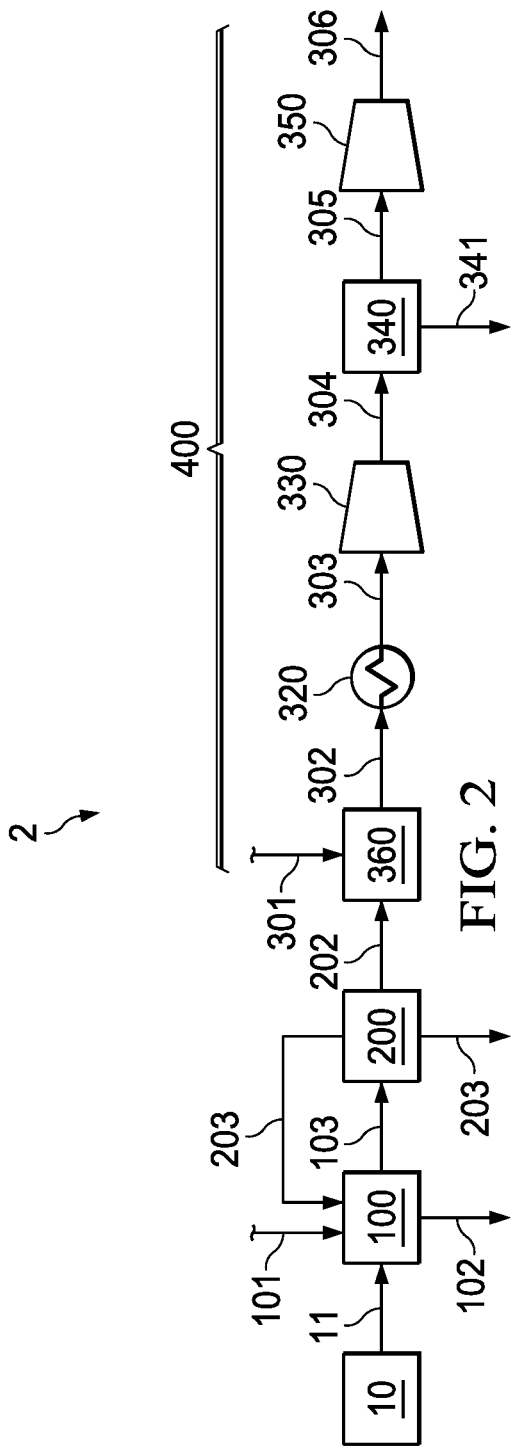
FIG. 2 is a schematic of another oxygen-enhanced Claus carbon dioxide recovery system 2.

FIG. 2 is a schematic of another oxygen-enhanced Claus carbon dioxide recovery system 2. The carbon dioxide recovery unit 400 in FIG. 2 can include one or more of an oxidation reactor 360, a heat exchanger 320, a blower or compressor 330, a dehydration unit 340, and an optional second blower or compressor 350. In FIG. 2, like numbers represent like components described in relation to FIG. 1, e.g., the description for the heat exchanger 320, the blower or compressor 330, the dehydration unit 340, and the optional second blower or compressor 350 in FIG. 1 is adequate for the system 2 in FIG. 2.

The oxidation reactor 360 of FIG. 2 is configured to receive the treated tail gas stream 202 and an oxygen stream 301 and to oxidize hydrogen received from the treated tail gas stream 202 to $H_2O$ via a catalytic oxidation process. In the catalytic oxidation process, hydrogen and oxygen are contacted with an oxidation catalyst to form $H_2O$ vapor. The oxidation catalyst can be contained in a catalyst bed that is located in the oxidation reactor 360.

Suitable oxidation catalysts can include metallic or non-metallic oxide type catalysts that promote reaction of $H_2$ with $O_2$ to form $H_2O$. For example, the oxidation catalyst can be selected from those catalysts comprising compounds of metals of Groups IV, V, VI, VIII, IX, and X of the Periodic Table of Elements, such as titanium, cobalt, molybdenum, chromium, vanadium, nickel, palladium, platinum, tungsten, oxides thereof, and any combinations thereof. In embodiments, the metal or metal compounds can be impregnated on a support, such as silica, alumina, or a combination of silica and alumina. In some embodiments, a non-metallic oxide used as the oxidation catalyst can be silica. In a particular embodiment, the oxidation catalyst can be titanium dioxide ($TiO_2$).

It is contemplated that trace amounts of other components (e.g., $N_2$, $H_2S$, $SO_2$, COS, $CS_2$) in the treated tail gas 202 can be oxidized in the catalytic oxidation process; however, the amount of these reactions should be marginal or negligible since removal of $H_2S$ and other sulfur-containing compounds is accomplished in the TGTU 200 down at least to ppmv levels, and nitrogen is only present in trace amounts due to the use of oxygen stream 11 (e.g., containing pure or almost pure oxygen in an amount disclosed above) in the SRU 100 instead of air. Thus, the primary function of the oxidation reactor 360 is to convert hydrogen to water vapor. The carbon dioxide and water received in the oxidation reactor 360 from the treated tail gas stream 202 pass through the oxidation reactor 360 and into the oxidation product stream 302.

The oxidation product stream 302 produced by the oxidation reactor 360 contains carbon dioxide and water vapor (water vapor received from treated tail gas stream 202 and water produced in the oxidation reactor 360). The combined concentration of carbon dioxide and water vapor in the oxidation product stream 302 can be greater than 97, 98, 99, 99.1, 99.2, 99.3, 99.4, 99.5, 99.6, 99.7, 99.8, or 99.9 vol %.

In embodiments, the oxidation reactor 360 of FIG. 2 can be operated at a temperature such that thermal oxidation reaction occurs. In such embodiments, the oxidation reactor 360, similar to oxidation reactor 360, may not require a fuel to reach appropriate temperature; or alternatively, the oxidation reactor 360 can include a burner or heated ceramic pieces to provide heat in the oxidation reactor 360 such that oxidation of hydrogen to $H_2O$ vapor is accomplished by both thermal oxidation mechanisms and by catalytic oxidation mechanism.

Figure 3:
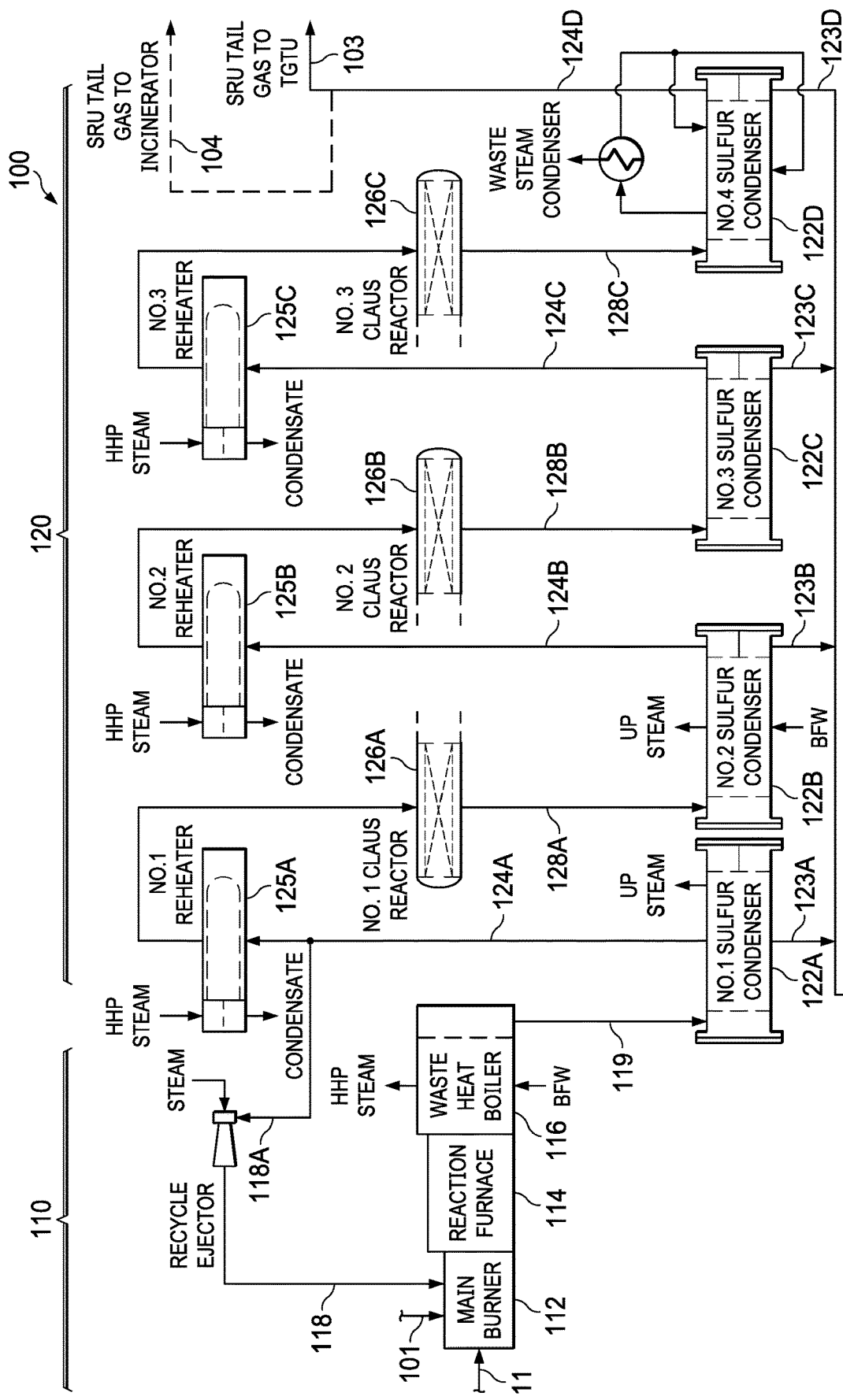
FIG. 3 is a schematic of an exemplary sulfur recovery unit 100 used in FIGS. 1-2.

FIG. 3 is a schematic of an exemplary sulfur recovery unit 100 used in FIGS. 1-2. The sulfur recovery unit 100 has a thermal stage 110 and a catalytic stage 120. The thermal stage 110 includes a burner 112, a reaction furnace 114, and a waste heat boiler 116. The burner 112 is configured to receive an oxygen stream 11, an acid gas stream 101, and a recycle stream 118, and to supply heat sufficient to burn the $H_2S$ received from the streams 101 and 118 using oxygen from oxygen stream 11 as the source for oxygen. The reaction mixture passes to the reaction furnace 114 where a desired fraction of the $H_2S$ is converted to $SO_2$ and water, and elemental sulfur and hydrogen are produced thermally. The reaction mixture passes the waste heat boiler 116 where heat is removed using via heat exchange with a boiler feed water (BFW). The heat exchange cools the reaction mixture, which leaves as thermal stage effluent 119, and heats the boiler feed water to produce HHP steam.

In embodiments, the acid gas stream 101 can include carbon dioxide and at least 5 vol % $H_2S$ (e.g., between 15-80 vol % $H_2S$).

The thermal stage effluent 119 is fed to the catalytic stage 120 of the sulfur recovery unit 100. The catalytic stage 120 in FIG. 3 includes a sequence of a plurality of condenser/reheater/reactor combinations (e.g., No. 1, No. 2, and No. 3 in FIG. 3) configured to produce the sulfur product stream 102 and the tail gas stream 103 via. Claus reactions that convert $SO_2$ and $H_2S$ to sulfur and water. The flow of components in the tail gas stream 103 can alternatively be directed to an incinerator via incinerator feed stream 104, e.g., when the tail gas treatment unit 200 is off-line for emergency, repair, maintenance, etc.

The thermal stage effluent 119 enters the sulfur condenser 122A of the No. 1 condenser/repeater/reactor combination. The thermal stage effluent 119 is cooled below the dew point of sulfur to so produce a liquid sulfur product 123A and a first gaseous effluent 124A, of which a portion 118A can be recycled back in recycle stream 118 to the thermal stage 110, if necessary, for temperature control in the burner 112/reaction furnace 114/waste heat boiler 116 to maintain the temperature at or below a rated nominal operational temperature for the refractory material. It should be appreciated that the quantity of the recycle gas can depend on the concentration of the $H_2S$ in the acid gas stream 101 and the quantity of oxygen delivered via oxygen stream 11. In embodiments, the recycle stream 118 will be between about 3% and 80% of the total volume of first gaseous effluent 124A. After reheating the remainder of first gaseous effluent 124A in the repeater 125A, the reheated stream is fed to a first catalytic reactor 126A (e.g., No. 1 Claus reactor in FIG. 3).

In an alternative embodiment, temperature in the thermal stage 110 can be controlled by having two reaction furnaces with associated waste heat boilers connected in series, where the oxygen stream 11 is split into two portions, one portion feeding to each reaction furnace. The split flow of oxygen can be used to limit the temperature within the reaction furnaces and the waste heat boiler can be used to reduce the heat of reaction between each reaction furnace. Particularly in such a configuration, the effluent stream 119 would flow to a second reaction furnace/waste heat boiler pair that is configured to receive the effluent stream 119 and a portion of the oxygen stream 11. The effluent from the section reaction furnace/waste heat boiler would then flow to the condenser 122A. Temperature is controlled by controlling the fraction of oxygen that flows to each reaction furnace/waste heat boiler pair so that if one furnace gets too hot, some of the oxygen flow is diverted to the other reaction furnace.

The first catalytic reactor 126A is configured to contact the $SO_2$ and $H_2S$ with a Claus catalyst to form elemental sulfur and water. First catalytic reactor 126A can be a conventional catalytic reactor for a Claus plant and the particular configuration and/or size may vary considerably and will mostly depend on the requirements of the Claus plant and volume/composition of acid gas that is to be treated. The catalyst(s) employed in the first catalytic reactor 126A is discussed below.

First catalytic reactor 126A produces first catalytic reactor effluent 128A that is fed to the second sulfur condenser 122B where elemental sulfur is removed from the cooled catalytic reactor effluent. Following the same sequence as for the first catalytic reactor 126A, the second gaseous effluent 124B from the second sulfur condenser 122B is reheated in the reheater 125B and is then fed to the second catalytic reactor 126B (e.g., No. 2 Claus reactor in FIG. 3). With respect to the second catalytic reactor 126B, the same considerations and concepts as provided for first catalytic reactor 126A apply.

Second catalytic reactor 126B thus produces second catalytic reactor effluent 128B that is fed to the third sulfur condenser 122C where elemental sulfur is removed from the cooled catalytic reactor effluent. The so generated third gaseous effluent 124C from the third sulfur condenser 122C is reheated in the reheater 125C and fed to the third catalytic reactor 126C (e.g., No. 3 Claus reactor in FIG. 3). In embodiments, the third gaseous effluent 124C can be sent to the TGTU 200 as the tail gas stream 103.

The SRU 100 can include an optional third catalytic reactor 126C. With respect to the third catalytic reactor 126C, the same considerations and concepts as provided for first catalytic reactor 126A apply. Third catalytic reactor 126C thus produces third catalytic reactor effluent 128C that is fed to the fourth sulfur condenser 122D where elemental sulfur is removed from the cooled catalytic reactor effluent. The so generated fourth gaseous effluent 124D from the fourth sulfur condenser 122D is then fed to the tail gas treatment unit 200 via tail gas stream 103 (alternatively, to an incinerator via incinerator feed stream 104).

In an embodiment, the tail gas stream 103 flowing from the third sulfur condenser 122C or the fourth sulfur condenser 122D can have a temperature in a range of from about 240° F. to about 300° F.; alternatively, about 250° F. to about 280° F.; alternatively, about 260° F.

With respect to the catalysts in the first, second, and/or third catalytic reactors 126A, 126B, and/or 126C, it is contemplated that all catalysts are suitable that directly or indirectly catalyze a reaction of $SO_2$ and $H_2S$ to form elemental sulfur, and as an option, catalysts can include direct oxidation catalysts (i.e., catalyzing oxidation of $H_2S$ to elemental sulfur), oxygen-sensitive Claus catalysts, and oxygen-tolerant catalysts that catalyze a Claus reaction (e.g., titanium type catalysts that have the capability of (a) converting $H_2S$ components to $SO_2$ in the presence of oxygen, and (b) carry out the $H_2S/SO_2$ to elemental sulfur (Claus) reaction). Moreover, it should be appreciated that the catalytic reactor may also include one or more oxygen scavenger beds, typically upstream of a catalyst bed that is sensitive to oxygen. Therefore, contemplated catalytic reactors may include only one type of catalyst, and especially preferred single catalyst reactors will operate with an oxygen-tolerant catalyst that catalyzes a Claus reaction (e.g., titanium type catalyst). In such case, oxygen will be preferably consumed by a reaction with $H_2S$ to ultimately produce elemental sulfur using the same catalyst as noted above. On the other hand, two or more types of catalysts may be employed where the first catalyst catalyzes a direct oxidation of $H_2S$ to elemental sulfur, and where the second catalyst is a conventional Claus catalyst that converts $H_2S$ and $SO_2$ to elemental sulfur. It should be noted that due to the use of recycle gas to the thermal stage, and enhanced formation of elemental sulfur using the above catalysts, the processing capacity for $H_2S$ is significantly increased. It should also be noted that the systems and methods presented herein are expected not only to save capital expenditure, but will also shorten revamp project schedules and/or mitigate unnecessary or prolonged shutdowns of existing sulfur recovery units during revamp.

With use of the oxygen stream 11, it is contemplated the temperatures in the thermal stage 110 will be higher than when using air, which may require recycling of substantial quantities of cooled acid gas from the first sulfur condenser 122A to the burner 112 or reaction furnace 114.

In further contemplated aspects of the inventive subject matter, it must be appreciated that the thermal stage 110 is generally operated to ensure stoichiometric excess of $H_2S$ over $SO_2$ (with respect to a conventional Claus reaction) for operation flexibility. Therefore, suitable ratios of $H_2S:SO_2$ will be between 2.0:1 and 2.3:1, between 2.3:1 and 3:1, between 3:1 and 4:1, between 4:1 and 5:1, or between 5:1 and 6:1, and even higher. Viewed form a different perspective, suitable ratios of $H_2S:SO_2$ will be at least 2.5:1, at least 3:1, at least 4:1, or at least 5:1.

FIG. 4 is a schematic of an exemplary tail gas treatment unit 200 used in FIGS. 1-2. The tail gas treatment unit (TGTU) 200 is configured to receive the tail gas stream 103 from the sulfur recovery unit 100. The tail gas stream 103 can contain hydrogen, carbon dioxide, $H_2S$, $H_2O$, and sulfur-containing compounds (e.g., COS, $CS_2$, $SO_2$). In the TGTU 200, at least a portion of the tail gas stream 103 (e.g., at a temperature in a range of from about 240° F. to about 300° F.; alternatively, about 250° F. to about 280° F.; alternatively, about 260° F.) can pass through a heat exchanger 210 to produce a heated tail gas stream 211 that feeds to a hydrogenation reactor 220. In embodiments, a temperature of the heated tail gas stream 211 can be in a range of from about 420° F. to about 460° F. The hydrogenation reactor 220 is generally configured to contain one or more hydrogenation catalyst(s) and configured to contact hydrogen and sulfur-containing compounds received from the tail gas stream 103 with one or more hydrogenation catalyst(s) in order to hydrogenate sulfur-containing compounds to $H_2S$. In embodiments, the hydrolysis of $CS_2$ in the presence of $H_2O$ can additionally occur in the hydrogenation reactor 220, which avoids any need for a hydrolysis reactor between the hydrogenation reactor 220 and the absorber 240.

Suitable hydrogenation catalysts can include those comprising compounds of metals of Groups IV, V, VI, VIII, IX, and X of the Periodic Table of Elements, such as titanium, cobalt, molybdenum, chromium, vanadium, nickel, tungsten, oxides thereof, and any combinations thereof. In embodiments, the metal or metal compounds can be impregnated or otherwise held on a support, such as silica, alumina, or a combination of silica and alumina.

The hydrogenation and hydrolysis reactions can occur in the hydrogenation reactor 220 at temperatures in a range from about 420° F. to about 650° F., depending on the hydrogenation catalyst composition.

In embodiments, hydrogen present for hydrogenation of components in the hydrogenation reactor 220 is only received from the tail gas stream 103 (e.g., is produced in the sulfur recovery unit 100) and is not received from another source.

Within the hydrogenation reactor 220, at least about 80 vol %, at least about 90 vol %, at least about 95 vol %, at least about 99 vol %, or substantially all (99.9 vol % or higher) of the sulfur-containing compounds (e.g., COS, $CS_2$, and $SO_2$) present in the tail gas stream 103 can be converted to $H_2S$.

The resulting hydrogenated product stream 221 (can also be referred to as a hydrogenated/hydrolyzed product stream to indicate the additional hydrolysis reactions) leaving the hydrogenation reactor 220 can then flow to a heat exchanger 230 that is configured to cool the hydrogenated product stream 221 and to produce a cooled hydrogenated product stream 231. In embodiments, the heat exchanger 230 can be a desuperheater/direct contact condenser. Cooling of the hydrogenated product stream 221 is for the purpose of reducing a temperature of the gases to an appropriate value for subsequent processing in the TGTU 200, s as absorption in the absorber 240. The carbon dioxide, hydrogen sulfide, water, and trace amounts of other components are in gas phase in the hydrogenated product stream 221 and in the cooled hydrogenated product stream 231. Upon cooling, any excess water that condenses can be removed in the heat exchanger 230, for example, by using a direct contact condenser.

In embodiments, the cooled hydrogenated product in stream 231 can flow directly to the absorber 240. In such embodiments, the absorber 240 is configured to receive the cooled hydrogenated product stream 231. The absorber 240 is further configured to circulate an amine solvent in a solvent circulation loop so as to selectively absorb hydrogen sulfide and other sulfur compounds while rejecting carbon dioxide, hydrogen, and water in a treated tail gas stream 202 (the absorber overhead stream). The components in the treated tail gas stream 202 are not vented to the atmosphere or transferred to an incinerator. The amine-based solvent containing hydrogen sulfide and small amounts of $CO_2$ can flow in the $H_2S$-loaded solvent stream 241 (e.g., the absorber bottom stream), to a cross-exchanger where the $H_2S$-loaded solvent stream is heated to form stream 243, which is received in a regenerator 250. The regenerated solvent stream 251 contains a lean amine solvent that is cooled in the cross-exchanger 242 and cooled in heat exchanger 252 to form a reflux stream 253 of the amine solvent that flows to the absorber 240. The regenerator 250 is also configured to recover a $H_2S$ stream 254 as the overhead product. The $H_2S$ stream 254 is cooled in heat exchanger 255 to condense any solvent and sulfur-containing compounds contained in the $H_2S$ stream 254 while maintaining the $H_2S$ in the gas phase. A separator 256 separates the cooled and partially condensed $H_2S$ stream 254 into an acid gas recycle stream 203 (e.g., containing predominantly $H_2S$) and a reflux stream 257 that is fed to the regenerator 250. In embodiments where sulfur-containing compounds (not including $H_2S$) are containing the $H_2S$-loaded solvent, it is possible that the sulfur-containing compounds can build up in the regenerator 250. In such scenarios and embodiments, a portion of the reflux stream 257 can be purged via stream 204 to maintain the level of sulfur-containing compounds in the regenerator 250 at or below an acceptable threshold concentration.

Figure 5:
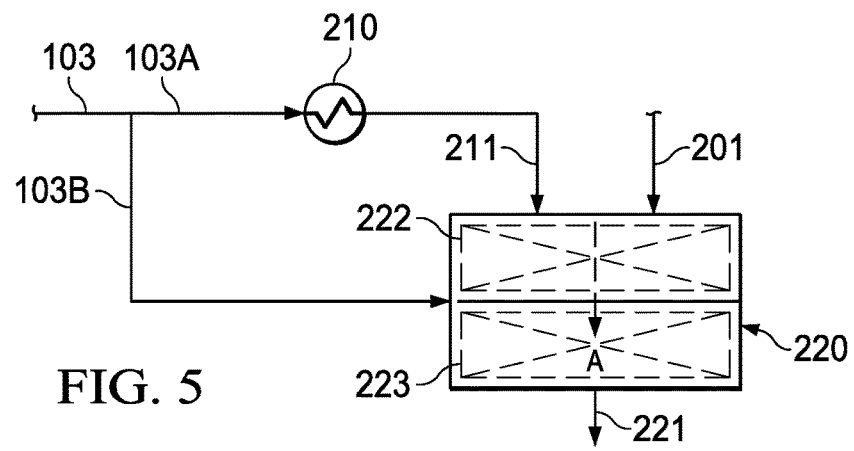
FIG. 5 illustrates an embodiment of the hydrogenation reactor 220 used in the tail gas treatment unit 200.

FIG. 5 illustrates an embodiment of the hydrogenation reactor 220 in the tail gas treatment unit 200. In such an embodiment, the TGTU 200 is configured to receive the tail gas stream 103 and an oxygen stream 201. The hydrogenation reactor 220 in such embodiments can be referred to as an "oxidation/hydrogenation reactor." In the embodiment of FIG. 5, the hydrogenation reactor 220 is configured to contain a first catalyst bed 222 containing an oxidation catalyst and a second catalyst bed 223 containing the hydrogenation catalyst. The oxidation catalyst is positioned upstream of the hydrogenation catalyst. Before entering the hydrogenation reactor 220, the components of the tail gas stream 103 flowing from the sulfur removal unit 100 have a temperature in a range of from about 240° F. to about 300° F.; alternatively, about 250° F. to about 280° F.; alternatively, about 260° F. FIG. 5 shows that tail gas stream 103 is split into two portions 103a and 103b (e.g., via appropriate piping/conduits, i.e., including a splitter). First portion 103a of the tail gas stream 103 flows to the heat exchanger 210 for heating to a temperature in a range of from about 420° F. to about 460° F., while the second portion 103b bypasses the heat exchanger 210 to feed the second portion 103b, remains at the temperature of the tail gas stream 103, and feeds to hydrogenation reactor 220 at a location that is in the middle of the first catalyst bed 222 (e.g., relative to a direction of flow of components through the bed 222). Within the first catalyst bed 222, the oxygen in oxygen stream 201 can catalytically react with the hydrogen in the tail gas stream 103 to produce water and heat, thereby raising the temperature of the stream passing through the first catalyst bed 222. In an embodiment, from about 5 vol % to about 20 vol % of the tail gas stream 103 flows in the first portion 103a, and the balance (e.g., about 80 vol % to about 95 vol %) flows in the second portion 103b. The flow-split of the tail gas stream 103 into portions 103a and 103b, as well as conditions in the hydrogenation reactor 220, can be controlled such that a temperature of the gaseous components leaving the first catalyst bed 222 have a temperature equal to or less than about 600° F. That is, the flow rate of stream 211 and or the oxygen stream 201 can be adjusted to ensure that after oxidation in the first catalyst bed 222 and subsequent mixing with stream 103b that is fed to a different location in (e.g., the middle of the first catalyst bed 222, the resulting temperature of the reaction mixture that passes to the second catalyst bed 223 is suitable for the hydrogenation and hydrolysis reactions that take place in the second catalyst bed 223. Doing so can avoid overheating the catalysts in both beds 222 and 223. A temperature of hydrogenation in the second catalyst bed 223 can be in a range from about 420° F. to about 650° F.; alternatively, from about 440° F. to about 650° F.; alternatively, from about 480° F. to about 650° F.; alternatively, from about 520° to about 650° F.; alternatively, from about 560° F. to about 650° F.; alternatively, from about 600° F. to about 650° F. Flow of gaseous components in the hydrogenation reactor 220 is in the direction of dashed arrow A.

When using the catalyst beds 222/223 and feed arrangement of portions 103a/103b, it is believed that the load on and the temperature of catalytic oxidation in the oxidation reactor 360 of FIG. 2 can be reduced, since some of the hydrogen that would otherwise flow to the oxidation reactor 360 from the tail gas treatment unit 200 is converted to water vapor in the hydrogenation reactor 220 of the tail gas treatment unit 200.

In the hydrogenation reactor 220, the components of the tail gas stream 103 received in the hydrogenation reactor 220 (e.g., via the heated tail gas stream 211) contact the oxidation catalyst under oxidation conditions that are selective to producing water vapor from hydrogen and oxygen. The components of the tail gas stream 103, along with the produced water vapor, then move through the reactor 220 in the direction of dashed arrow A and into contact with the hydrogenation catalyst under conditions that are less selective than the oxidation catalyst, so that the sulfur-containing compounds hydrogenate to produce $H_2S$, in addition to hydrogenation of oxygen to tram water vapor.

In FIG. 5, the oxidation catalyst is contained in a catalyst bed 222 that is above the catalyst bed 223 in which the hydrogenation catalyst is contained; however, it is contemplated that other physical arrangements can produce the same effect as long as the oxidation catalyst contacts the tail gas components before the hydrogenation catalyst. In an embodiment, the oxidation catalyst can be titanium dioxide (TiO2), and the hydrogenation catalyst can be a cobalt-molybdenum (CoMo) catalyst. Generally, the temperature of hydrogenation for the oxidation catalyst is lower than the temperature of hydrogenation for the hydrogenation catalyst.

While the catalyst beds 222/223 are illustrated in FIG. 5 as being in a single vessel, it is contemplated that the first catalyst bed 222 can be contained in a vessel separate from a second vessel that contains the second catalyst bed 223. In such scenario, an oxidation effluent stream can connect the first vessel with the second vessel. The feed configuration and reactions would otherwise be the same for the hydrogenation reactor 220 described for FIG. 5, and the cooled hydrogenation product stream 231 can flow to the absorber 240 for further treatment in the tail gas treatment unit 200 as is described for FIG. 4 to produce the treated tail gas 202. The treated tail gas 202 can subsequently be treated in the carbon dioxide recovery unit 300 or 400 according to any embodiment described herein in order to produce the carbon dioxide product stream 305.

For each of FIGS. 1 to 5, process control equipment and common operating equipment (e.g., heart exchangers, pumps, blowers, compressors, and valves) are not shown for clarity. The equipment can be coupled to conduits/piping and components shown in the SRU 100, TGTU 200, and carbon dioxide recovery unit 300/400 of the figures, to accomplish the recovery of carbon dioxide from an acid gas stream.

The embodiments described for FIG. 5 allow for oxidation of hydrogen in the TGTU 200 when levels of hydrogen in the treated tail gas stream 202 would otherwise be high enough to become a problem for the oxidation reactor 310 or 360 (e.g., operating temperature too high, etc.) Thus, placing an oxidation catalyst in the first catalyst bed 222 in the hydrogenation reactor 220 prevents the oxidation reactor 310 or 360 from being overburdened with conversion of hydrogen to water. Additionally, splitting tail gas stream 103 into portions 103a and 103b allows for temperature control in the hydrogenation reactor 220 having the oxidation catalyst therein. The flow rate of the first portion 103a (and thus the flow rate of the second portion 103b) can be adjusted so that the reaction mixture leaving the oxidation catalyst bed 222 is no greater than 600° F. For example, if the oxidation of hydrogen raises the temperature to 600° F., the amount of the tail gas in portion 103a can be reduced and the amount of tail gas in the portion 103b can be increased so that more of the relatively cooler tail gas enters the oxidation catalyst bed 222 at a location further downstream in the oxidation catalyst bed 222 such that the time the tail gas is in contact with the oxidation catalyst is reduced. Higher amounts of cooler tail gas in combination with less contact time with the catalyst would lower a temperature of the reaction mixture flowing into the hydrogenation catalyst bed 223. If the temperature over the oxidation catalyst needs to be raised, the amount of the tail gas in portion 103a and/or the amount of oxygen in oxygen stream 201 can be increased and the amount of tail gas in the portion 103b can be decreased so that more of the relatively hotter tail gas enters the oxidation catalyst bed 222 at a location upstream of the oxidation catalyst bed 222 such that the time the tail gas is in contact with the oxidation catalyst is increased (i.e., there is more distance to travel through the oxidation catalyst). Higher amounts of heated tail gas in combination with a longer contact time with the oxidation catalyst would increase a temperature of the reaction mixture flowing into the hydrogenation catalyst bed 223.

A process for recovery of carbon dioxide from an acid gas stream 101 is also disclosed. Embodiments of the process are described with reference to the components in the figures. Embodiments of the process can include one or more of feeding a first oxygen stream 11 comprising at least 90 vol %, at least 95 vol %, or at least 98 vol % oxygen and the acid gas stream 101 comprising carbon dioxide and sulfur-containing compounds to a sulfur recovery unit 100; recovering a sulfur product stream 102 and a tail gas stream 103 from the sulfur recovery unit 100, wherein the tail gas stream 103 includes carbon dioxide, hydrogen, sulfur-containing compounds, and hydrogen sulfide; receiving the tail gas stream 103 and a second oxygen stream 201 in a tail gas treatment unit 200; optionally heating, in the tail gas treatment unit 200, the tail gas stream 103; contacting, in the tail gas treatment unit 200, hydrogen received from the tail gas stream 103 or the heated tail gas stream 211 and oxygen received from the second oxygen stream 201 with an oxidation catalyst to produce water; contacting, in the tail gas treatment unit 200, the sulfur-containing compounds and hydrogen received from the tail gas stream 103 or the heated tail gas stream 211 with a hydrogenation catalyst to produce a hydrogenated product stream 221 comprising carbon dioxide, hydrogen sulfide, water vapor, and hydrogen; optionally cooling the hydrogenated product stream 221 to form cooled hydrogenated product stream 231; contacting the hydrogenated product stream 221 or the cooled hydrogenated product stream 231 with a solvent in an absorber 240 to produce a treated tail gas stream 202 and $H_2S$-loaded solvent stream 241 (e.g., in an absorber bottom stream), wherein the treated tail gas stream 202 comprises carbon dioxide, water vapor, and hydrogen, wherein the $H_2S$-loaded solvent stream 241 comprises hydrogen sulfide and the solvent; converting, via thermal oxidation or catalytic oxidation, hydrogen of the treated tail gas stream 202 to water vapor to produce an oxidation product stream 302 comprising carbon dioxide and water vapor; cooling and optionally increasing a pressure of the oxidation product stream 302 to form a cooled oxidation product stream 303 and/or a pressurized oxidation product stream 304; separating water from the oxidation product stream 302, cooled oxidation product stream 303, or the pressurized oxidation product stream 304 to produce a carbon dioxide product stream 305; optionally producing water stream 341 from the step of separating; optionally increasing a pressure of the carbon dioxide product stream 305 to produce a pressurized carbon dioxide product stream 306 at an on-spec pressure. For example, blower or compressor 350 can be one or more blowers or compressors in parallel, in series, or both in parallel and in series that compress the carbon dioxide product to a specified pressure suitable for transportation, storage, or use elsewhere on the site of the system 1 or 2.

This disclosure also contemplates a method for retrofitting a sulfur recovery unit 100 and a tail gas treatment unit 200 to recover a carbon dioxide product stream 305. Conventional sulfur recovery units receive an acid gas stream (e.g., like stream 101) and air for a Claus reaction. The disclosed method for retrofitting comprises connecting the sulfur recovery unit 100 to an oxygen source 10 configured to provide an oxygen stream 11 comprising greater than 90 vol %, at least 95 vol %, or at least 98 vol % oxygen to a burner 112 of the sulfur recovery unit 100; disallowing or stopping a flow of air to the burner 112 of the sulfur recovery unit 100; adding a desuperheater/direct contact condenser upstream of the absorber 240 in the tail gas treatment unit 200, the desuperheater/direct contact condenser being configured to at least partially condense water for removal from the tail gas treatment unit 200 at a location upstream of the absorber 240; and adding a carbon dioxide recovery unit 300/400 that is configured to produce the carbon dioxide product stream 305 from a treated tail gas stream 202 received from the tail gas treatment unit 200. The method for retrofitting can further include converting, in the oxidation reactor 310/360 of the carbon dioxide recovery unit 300/400, hydrogen received from the treated tail gas stream 202 to water via thermal oxidation or catalytic oxidation to produce an oxidation product stream 302 comprising carbon dioxide and water vapor; separating, in the dehydration unit 340 of the carbon dioxide recovery unit 300/400, water from carbon dioxide received from the oxidation product stream 302/303/304 to produce the carbon dioxide product stream 305 and optionally a water stream 341; optionally cooling the oxidation product stream 302 upstream of the dehydration unit 340; optionally increasing a pressure of the oxidation product stream 302/303/304; optionally increasing a pressure of the carbon dioxide product stream 305/306.

For the systems and processes disclosed herein, where present, water is in vapor phase (gas phase) unless otherwise specified. For example, at least some of the water that is in vapor phase in the oxidation product stream 302 condenses in stream 303 or 304, or in the dehydration unit 340; thus, liquid water may additionally be present in streams 303 and/or 304 as well as the dehydration unit 340. Liquid water is recovered in water stream 341.

Similarly, for the systems and processes disclosed herein, where present, hydrogen sulfide, other sulfur-containing compounds, and elemental sulfur are in gas phase unless otherwise specified. For example, liquid elemental sulfur may be present in streams 123A, 123B, 123C, 123D, and 102 of the SRU 100. Hydrogen sulfide and sulfur-containing compounds in the solvent of the absorber 240 of the TGTU 200 may or may not be in the gas phase, depending on the mechanism of absorption.

For the systems and processes disclosed herein, the purity of oxygen in the oxygen stream 11, oxygen stream 132, oxygen stream 201, oxygen stream 301, or any combination thereof can depend on the purity requirements (i.e., purity specification) of the carbon dioxide product. For example, in embodiments in which the oxygen concentration in oxygen stream 11 that feeds to SRU 100 is 100 vol % or close to 100 vol % (e.g., greater than 98 vol %), the treated tail gas 202 output from the TGTU 200 can have from about 15 vol % to about 35 vol % hydrogen. In such a scenario, it is believed that the oxidation reactor 310 of FIG. 1 having only thermal oxidation can obtain a close to pure carbon dioxide product in the carbon dioxide recovery unit 300. Using oxidation reactor 360 of FIG. 2 would also achieve pure carbon dioxide; however, the oxidation reactor 360 would cost more than the oxidation reactor 310 having only thermal oxidation. On the other hand, in embodiments in which the oxygen concentration in oxygen stream 11 that feeds to SRU 100 is less pure (e.g., 90 vol % oxygen, balance including nitrogen), the treated tail gas 202 output from the TGTU 200 can have from about 10 vol % to about 30 vol % hydrogen. In such a scenario, it is believed that the oxidation reactor 360 of FIG. 2 having catalytic oxidation can achieve suitable purities for the carbon dioxide product; although, some nitrogen may be present in the carbon dioxide product. Using oxidation reactor 310 of FIG. 1 can also achieve suitable purities for carbon dioxide product; however, under certain operating conditions the oxidation reactor 360 of FIG. 2 would be more cost-effective than oxidation reactor 310 having only thermal oxidation.

For the systems and processes disclosed herein, the amount of cooling and pressurizing that occurs in the carbon dioxide recovery unit 300/400 (e.g., via heat exchanger 320, blower or compressor 330, any heat exchanger in dehydration unit 340, blower or compressor 350) can be adjusted depending on the purity specification of carbon dioxide product.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude tailing within the expressly stated ranges or limitations (e.g., from about 1 to about 10 includes, 2, 3, 4, etc.; greater than 0.10 includes 0.11, 0.12, 0.13, etc.). For example, whenever numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 90, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiments) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Having described various systems and processes herein, specific embodiments or aspects can include, but are not limited to:

Embodiments disclosed herein include:

A: A process for recovery of carbon dioxide from an acid gas stream can included one or more of: feeding a first oxygen stream comprising at least 90 vol % oxygen and the acid gas stream comprising carbon dioxide and sulfur-containing compounds to a sulfur recovery unit; recovering a sulfur product stream and a tail gas stream from the sulfur recovery unit, wherein the tail gas stream comprises carbon dioxide, hydrogen, sulfur-containing compounds, water, and hydrogen sulfide; receiving the tail gas stream in a tail gas treatment unit; contacting, in the tail gas treatment unit, the sulfur-containing compounds and hydrogen received from the tail gas stream with a hydrogenation catalyst to produce a hydrogenated product stream comprising carbon dioxide, hydrogen sulfide, water, and hydrogen; contacting the hydrogenated product stream with a solvent in an absorber to produce a treated tail gas stream and a $H_2S$-loaded solvent stream, wherein the treated tail gas stream comprises carbon dioxide, water, and hydrogen, wherein the $H_2S$-loaded solvent stream comprises hydrogen sulfide and the solvent; converting, via thermal oxidation or catalytic oxidation, hydrogen of the treated tail gas stream to water to produce an oxidation product stream comprising carbon dioxide and water; cooling and optionally increasing a pressure of the oxidation product stream; and separating water from the oxidation product stream to produce a carbon dioxide product stream.

B. A system for recovery of a carbon dioxide product stream from acid gas can include one or more of: an oxygen source configured to produce a first oxygen stream comprising at least 90 vol % oxygen; a sulfur recovery unit configured to receive a first oxygen stream and an acid gas stream and configured to produce a tail gas stream and a sulfur product stream, wherein the tail gas stream comprises carbon dioxide, hydrogen, sulfur-containing compounds, water, and hydrogen sulfide; a tail gas treatment unit comprising a hydrogenation reactor and an absorber; and a carbon dioxide recovery unit comprising an oxidation reactor and a dehydration unit. The hydrogenation reactor can be configured to convert the sulfur-containing compounds received from the tail gas stream to hydrogen sulfide, and produce a hydrogenated product stream. The absorber can be configured to receive the hydrogenated product stream, selectively absorb hydrogen sulfide, produce a treated tail gas stream comprising carbon dioxide, water, and hydrogen, and produce a H2S-loaded solvent stream comprising hydrogen sulfide and a solvent. The oxidation reactor can be configured to receive the treated tail gas stream and to convert hydrogen to water via thermal oxidation or catalytic oxidation to produce an oxidation product stream comprising carbon dioxide and water. The dehydration unit can be configured to receive the oxidation product stream and to separate the water from the carbon dioxide to produce the carbon dioxide product stream.

C. A method for retrofitting a sulfur recovery unit and a tail gas treatment unit to recover a carbon dioxide product stream can include one or more of: connecting the sulfur recovery unit to an oxygen source configured to provide an oxygen stream comprising equal to or greater than 90 vol % oxygen to a burner of the sulfur recovery unit; disallowing a flow of air to the burner of the sulfur recovery unit; adding a desuperheater/direct contact condenser upstream of an absorber in the tail gas treatment unit, wherein the desuperheater/direct contact condenser is configured to at least partially condense water for removal from the tail gas treatment unit at a location upstream of the absorber; and adding a carbon dioxide recovery unit that is configured to produce the carbon dioxide product stream from a treated tail gas stream received from the tail gas treatment unit.

Each of embodiments A, B, and C may have one or more of the following additional elements: Element 1: the treated tail gas stream comprises carbon dioxide in a range of from about 30 vol % to about 70 vol %, hydrogen in a range of from about 10 vol % to about 30 vol %, and hydrogen sulfide in a range of about 2 ppmv to about 10 ppmv. Element 2: the hydrogenation reactor uses hydrogen formed in the sulfur recovery unit and does not use hydrogen from another source. Element 3: the sulfur recovery unit is operated at a temperature such that hydrogen is formed in the sulfur recovery unit. Element 4: increasing a pressure of the carbon dioxide product stream to an on-spec pressure. Element 5: receiving a second oxygen stream in the tail gas treatment unit; and contacting, in the tail gas treatment unit, hydrogen received from the tail gas stream and oxygen received from the second oxygen stream with an oxidation catalyst to produce water. Element 6: the oxidation catalyst comprises titanium dioxide. Element 7: the hydrogenation catalyst comprises cobalt, molybdenum, or both cobalt and molybdenum. Element 8: heating, in the tail gas treatment unit, the tail gas stream prior to the steps of contacting. Element 9: no portion of the treated tail gas stream is vented to the atmosphere or sent to an incinerator. Element 10: the carbon dioxide product stream comprises greater than 95 vol % carbon dioxide. Element 11: no fuel gas is required for converting hydrogen of the treated tail gas to water. Element 12: the carbon dioxide recovery unit further comprises a heat exchanger configured to cool the oxidation product stream upstream of the dehydration unit. Element 13: the carbon dioxide recovery unit further comprises a first blower or compressor configured to increase a pressure of the oxidation product stream upstream of the dehydration unit. Element 14: the carbon dioxide recovery unit further comprises a second blower or compressor configured to increase a pressure of the carbon dioxide product stream. Element 15: the hydrogenation reactor comprises a first catalyst bed containing an oxidation catalyst and a second catalyst bed containing a hydrogenation catalyst. Element 16: the tail gas treatment unit further comprises a splitter configured to split the tail gas stream into a first portion and a second portion; and a heat exchanger configured to heat the first portion of the tail gas stream upstream of the hydrogenation reactor, wherein the hydrogenation reactor is configured to receive the heated first portion upstream of the first catalyst bed, and wherein the hydrogenation reactor is configured to receive the second portion in a middle of the first catalyst bed. Element 17: converting, in an oxidation reactor of the carbon dioxide recovery unit, hydrogen received from the treated tail gas stream to water via thermal oxidation or catalytic oxidation to produce an oxidation product stream comprising carbon dioxide and water. Element 18: separating, in a dehydration unit of the carbon dioxide recovery unit, water from carbon dioxide received from the oxidation product stream to produce the carbon dioxide product stream. Element 19: cooling the oxidation product stream upstream of the dehydration unit. Element 20: increasing a pressure of the oxidation product stream upstream of the dehydration unit. Element 21: increasing a pressure of the carbon dioxide product stream.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for recovery of carbon dioxide from an acid gas stream, comprising:
    feeding a first oxygen stream comprising at least 90 vol % oxygen and the acid gas stream comprising carbon dioxide and sulfur-containing compounds to a sulfur recovery unit;
    recovering a sulfur product stream and a tail gas stream from the sulfur recovery unit, wherein the tail gas stream comprises carbon dioxide, hydrogen, sulfur-containing compounds, water, and hydrogen sulfide;
    receiving the tail gas stream in a tail gas treatment unit configured to produce a treated tail gas stream;
    receiving a second oxygen stream in the tail gas treatment unit;
    contacting, in the tail gas treatment unit, hydrogen received from the tail gas stream and oxygen received from the second oxygen stream with an oxidation catalyst to produce water;
    contacting, in the tail gas treatment unit, the sulfur-containing compounds and hydrogen received from the tail gas stream with a hydrogenation catalyst to produce a hydrogenated product stream comprising carbon dioxide, hydrogen sulfide, water, and hydrogen;
    contacting the hydrogenated product stream with a solvent in an absorber to produce the treated tail gas stream and a H$_2$S-loaded solvent stream, wherein the treated tail gas stream comprises carbon dioxide, water, and hydrogen, wherein the H$_2$S-loaded solvent stream comprises hydrogen sulfide and the solvent;
    converting, via thermal oxidation or catalytic oxidation, hydrogen of the treated tail gas stream to water to produce an oxidation product stream comprising carbon dioxide and water;
    cooling and optionally increasing a pressure of the oxidation product stream; and
    separating water from the oxidation product stream to produce a carbon dioxide product stream.

2. The process of claim 1, wherein the treated tail gas stream comprises carbon dioxide in a range of from about 30 vol % to about 70 vol %, hydrogen in a range of from about 10 vol % to about 30 vol %, and hydrogen sulfide in a range of about 2 ppmv to about 10 ppmv.

3. The process of claim 1, further comprising:
    increasing a pressure of the carbon dioxide product stream to an on-spec pressure.

4. The process of claim 1, wherein the
    contacting, in the tail gas treatment unit, of the hydrogen received from the tail gas stream and the oxygen received from the second oxygen stream with the oxidation catalyst to produce water is effected prior to the contacting, in the tail gas treatment unit, the sulfur-containing compounds and the hydrogen received from the tail gas stream with the hydrogenation catalyst to produce the hydrogenated product stream comprising carbon dioxide, hydrogen sulfide, water, and hydrogen.

5. The process of claim 4, wherein the oxidation catalyst comprises titanium dioxide.

6. The process of claim 1, wherein the hydrogenation catalyst comprises cobalt, molybdenum, or both cobalt and molybdenum.

7. The process of claim 1, wherein no portion of the treated tail gas stream is vented to the atmosphere or sent to an incinerator.

8. The process of claim 1, wherein the carbon dioxide product stream comprises greater than 95 vol % carbon dioxide.

9. The process of claim 1, wherein no fuel gas is required for converting hydrogen of the treated tail gas stream to water.

10. A process for recovery of carbon dioxide from an acid gas stream, comprising:
    feeding a first oxygen stream comprising at least 90 vol % oxygen and the acid gas stream comprising carbon dioxide and sulfur-containing compounds to a sulfur recovery unit;
    recovering a sulfur product stream and a tail gas stream from the sulfur recovery unit, wherein the tail gas stream comprises carbon dioxide, hydrogen, sulfur-containing compounds, water, and hydrogen sulfide;
    receiving the tail gas stream in a tail gas treatment unit
    contacting, in the tail gas treatment unit, the sulfur-containing compounds and hydrogen received from the tail gas stream with a hydrogenation catalyst to produce a hydrogenated product stream comprising carbon dioxide, hydrogen sulfide, water, and hydrogen;
    contacting the hydrogenated product stream with a solvent in an absorber to produce a treated tail gas stream and a H$_2$S-loaded solvent stream, wherein the treated tail gas stream comprises carbon dioxide, water, and hydrogen, wherein the H$_2$S-loaded solvent stream comprises hydrogen sulfide and the solvent;
    converting, via thermal oxidation or catalytic oxidation, hydrogen of the treated tail gas stream to water to produce an oxidation product stream comprising carbon dioxide and water;
    cooling and optionally increasing a pressure of the oxidation product stream; and
    separating water from the oxidation product stream to produce a carbon dioxide product stream,
    wherein a hydrogenation reactor of the tail gas treatment unit uses hydrogen formed in the sulfur recovery unit and does not use hydrogen from another source.

11. The process of claim 10, wherein the sulfur recovery unit is operated at a temperature such that hydrogen is formed in the sulfur recovery unit.

12. A process for recovery of carbon dioxide from an acid gas stream, comprising:
    feeding a first oxygen stream comprising at least 90 vol % oxygen and the acid gas stream comprising carbon dioxide and sulfur-containing compounds to a sulfur recovery unit;
    recovering a sulfur product stream and a tail gas stream from the sulfur recovery unit, wherein the tail gas stream comprises carbon dioxide, hydrogen, sulfur-containing compounds, water, and hydrogen sulfide;
    receiving the tail gas stream in a tail gas treatment unit
    heating, in the tail gas treatment unit, the tail gas stream to provide a heated tail gas stream;

contacting, in the tail gas treatment unit, the sulfur-containing compounds and hydrogen received from the heated tail gas stream with a hydrogenation catalyst to produce a hydrogenated product stream comprising carbon dioxide, hydrogen sulfide, water, and hydrogen;

contacting the hydrogenated product stream with a solvent in an absorber to produce a treated tail gas stream and a H$_2$S-loaded solvent stream, wherein the treated tail gas stream comprises carbon dioxide, water, and hydrogen, wherein the H$_2$S-loaded solvent stream comprises hydrogen sulfide and the solvent;

converting, via thermal oxidation or catalytic oxidation, hydrogen of the treated tail gas stream to water to produce an oxidation product stream comprising carbon dioxide and water;

cooling and optionally increasing a pressure of the oxidation product stream; and separating water from the oxidation product stream to produce a carbon dioxide product stream.

13. A system for recovery of a carbon dioxide product stream from acid gas comprising:
an oxygen source configured to produce an oxygen stream comprising at least 90 vol % oxygen;
a sulfur recovery unit configured to receive the oxygen stream and an acid gas stream and configured to produce a tail gas stream and a sulfur product stream, wherein the tail gas stream comprises carbon dioxide, hydrogen, sulfur-containing compounds, water, and hydrogen sulfide;
a tail gas treatment unit comprising a heater, a hydrogenation reactor and an absorber,
wherein the heater is configured for heating, in the tail gas treatment unit, the tail gas stream to provide a heated tail gas stream,
wherein the hydrogenation reactor is configured to convert the sulfur-containing compounds received from the heated tail gas stream to hydrogen sulfide, and produce a hydrogenated product stream,
wherein the absorber is configured to receive the hydrogenated product stream, selectively absorb hydrogen sulfide, produce a treated tail gas stream comprising carbon dioxide, water, and hydrogen, and produce a H2S-loaded solvent stream comprising hydrogen sulfide and a solvent; and
a carbon dioxide recovery unit comprising an oxidation reactor and a dehydration unit,
wherein the oxidation reactor is configured to receive the treated tail gas stream and to convert hydrogen to via thermal oxidation or catalytic oxidation to produce an oxidation product stream comprising carbon dioxide and water,
wherein the dehydration unit is configured to receive the oxidation product stream and to separate the water from the carbon dioxide to produce the carbon dioxide product stream.

14. The system of claim 13, wherein the carbon dioxide recovery unit further comprises:
a heat exchanger configured to cool the oxidation product stream upstream of the dehydration unit;
a first blower or compressor configured to increase a pressure of the oxidation product stream upstream of the dehydration unit; and
a second blower or compressor configured to increase a pressure of the carbon dioxide product stream.

15. A system for recovery of a carbon dioxide product stream from acid gas comprising:

an oxygen source configured to produce an oxygen stream comprising at least 90 vol % oxygen;
a sulfur recovery unit configured to receive the oxygen stream and an acid gas stream and configured to produce a tail gas stream and a sulfur product stream, wherein the tail gas stream comprises carbon dioxide, hydrogen, sulfur-containing compounds, water, and hydrogen sulfide;
a tail gas treatment unit comprising a hydrogenation reactor and an absorber,
wherein the hydrogenation reactor is configured to convert the sulfur-containing compounds received from the tail gas stream to hydrogen sulfide, and produce a hydrogenated product stream,
wherein the absorber is configured to receive the hydrogenated product stream, selectively absorb hydrogen sulfide, produce a treated tail gas stream comprising carbon dioxide, water, and hydrogen, and produce a H2S-loaded solvent stream comprising hydrogen sulfide and a solvent; and
a carbon dioxide recovery unit comprising an oxidation reactor and a dehydration unit,
wherein the oxidation reactor is configured to receive the treated tail gas stream and to convert hydrogen to via thermal oxidation or catalytic oxidation to produce an oxidation product stream comprising carbon dioxide and water,
wherein the dehydration unit is configured to receive the oxidation product stream and to separate the water from the carbon dioxide to produce the carbon dioxide product stream,
wherein the hydrogenation reactor comprises a first catalyst bed containing an oxidation catalyst and a second catalyst bed containing a hydrogenation catalyst, wherein the tail gas treatment unit further comprises:
a splitter configured to split the tail gas stream into a first portion and a second portion; and
a heat exchanger configured to heat the first portion of the tail gas stream upstream of the hydrogenation reactor;
wherein the hydrogenation reactor is configured to receive the heated first portion upstream of the first catalyst bed,
wherein the hydrogenation reactor is configured to receive the second portion in a middle of the first catalyst bed.

16. A method for retrofitting a sulfur recovery unit and a tail gas treatment unit to recover a carbon dioxide product stream, the method comprising:
connecting the sulfur recovery unit to an oxygen source configured to provide an oxygen stream comprising equal to or greater than 90 vol % oxygen to a burner of the sulfur recovery unit;
disallowing a flow of air to the burner of the sulfur recovery unit;
adding a desuperheater/direct contact condenser upstream of an absorber in the tail gas treatment unit, wherein the desuperheater/direct contact condenser is configured to at least partially condense water for removal from the tail gas treatment unit at a location upstream of the absorber; and
adding a carbon dioxide recovery unit that is configured to produce the carbon dioxide product stream from a treated tail gas stream received from the tail gas treatment unit,
wherein a hydrogenation reactor of the tail gas treatment unit uses hydrogen formed in the sulfur recovery unit and does not use hydrogen from another source.

17. The method of claim 16, further comprising:
converting, in an oxidation reactor of the carbon dioxide recovery unit, hydrogen received from the treated tail gas stream to water via thermal oxidation or catalytic oxidation to produce an oxidation product stream comprising carbon dioxide and water; and
separating, in a dehydration unit of the carbon dioxide recovery unit, water from carbon dioxide received from the oxidation product stream to produce the carbon dioxide product stream.

18. The method of claim 17, further comprising:
cooling the oxidation product stream upstream of the dehydration unit.

19. The method of claim 17, further comprising:
increasing a pressure of the oxidation product stream upstream of the dehydration unit.

20. The method of claim 17, further comprising:
increasing a pressure of the carbon dioxide product stream.

* * * * *

UNITED STATES PATENT AND TRADEMARK OFFICE
CERTIFICATE OF CORRECTION

PATENT NO. : 11,097,952 B2
APPLICATION NO. : 16/435056
DATED : August 24, 2021
INVENTOR(S) : Thomas K. T. Chow et al.

Page 1 of 1

It is certified that error appears in the above-identified patent and that said Letters Patent is hereby corrected as shown below:

In the Claims

Column 20, Line 29, add --;-- after "unit"

Column 20, Line 65, add --;-- after "unit"

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*